(12) United States Patent
Chang

(10) Patent No.: US 8,528,570 B2
(45) Date of Patent: Sep. 10, 2013

(54) ONE-TOUCH ARTIFICIAL NAIL

(76) Inventor: Sung Yong Chang, Roslyn Heights, NY (US)

(*) Notice: Subject to any disclaimer, the term of this patent is extended or adjusted under 35 U.S.C. 154(b) by 0 days.

(21) Appl. No.: 13/417,871

(22) Filed: Mar. 12, 2012

(65) Prior Publication Data

US 2013/0104920 A1 May 2, 2013

(30) Foreign Application Priority Data

Oct. 31, 2011 (KR) .................. 10-2011-0112255

(51) Int. Cl.
*A45D 29/00* (2006.01)

(52) U.S. Cl.
USPC ............................................ 132/73; 132/73.5

(58) Field of Classification Search
USPC .................................. 132/73, 73.5; 424/61
See application file for complete search history.

(56) References Cited

U.S. PATENT DOCUMENTS
7,185,660 B1   3/2007   Han

FOREIGN PATENT DOCUMENTS
JP   31-10041   6/2005

*Primary Examiner* — Rachel Steitz
(74) *Attorney, Agent, or Firm* — Alston & Bird LLP

(57) ABSTRACT

Provided is a one-touch artificial nail including: a nail body coupled to a nail, and an adhesive surface formed at a location facing the nail; a design layer formed by painting an upper portion of the nail body; a double-sided adhesive tape body attached to a lower portion of the nail body and having curved portions where first cutting lines having a linear shape in a vertical direction are formed, and connecting portions formed between the first cutting lines so that the curved portions are not separated; and a release tape detachably coupled to the double-sided adhesive tape body, having a greater area than the double-sided adhesive tape body, and having second cutting lines formed at the same locations as the first cutting lines to pass in the vertical direction, wherein the release tape has a grip protruding from the outer circumference of the release tape and the nail body.

16 Claims, 5 Drawing Sheets

ONE-TOUCH ARTIFICIAL NAIL

CROSS-REFERENCE TO RELATED APPLICATIONS

This application claims priority under 35 U.S.C. §119 to Korean Patent Application No. 10-2011-0112255 filed on Oct. 31, 2011, in the Korean Intellectual Property Office, the disclosure of which is incorporated herein by reference in its entirety.

TECHNICAL FIELD

The present disclosure relates to a one-touch artificial nail, and more particularly, to a one-touch artificial nail capable of preventing a gap from being generated between an artificial nail and a double-sided adhesive tape body when being attached to the artificial nail, and capable of preventing a release tape from being detached from the double-sided adhesive tape body during a manufacturing process.

BACKGROUND

Generally, when it is intended to improve the appearance of a nail by applying a nail polish, the glossiness by the nail polish has glossiness of about 40 according to the glossiness test result of ASTM D523. However, this corresponds to the case where nail polishing is applied to a smooth surface. In order to obtain about glossiness of 40 when nail polishing is actually applied a nail of a person, a base coat, a nail polish, and a top coat should be applied to the nail in order, and the nail polish should be applied one or two times to give an inherent color of the nail polish. Further, in a case where a solution such as the base coat, the nail polish, and top coat is applied, a solution corresponding to a next step may be applied after a solution corresponding to a previous step is dried. In this process, it takes 20 to 30 minutes to dry the solution by using a wind generating device or the like. Therefore, in order to apply the nail polish to have glossiness of 40, at least one and half hour should be taken. Further, since solutions are applied over several layers, at least one day is consumed until the nail polish or the like is completely dried. Further, during shifting from a semi-dried stage to a completely dried stage, a scratch may be created by a weak impact corresponding to 3B based on pencil hardness, and thus the appearance of the nail is rather deteriorated.

In the related art, in order to solve this problem, a double-sided adhesive tape attached to an artificial nail has been used for the convenience of users. A general double-sided adhesive tape 5 has a planar shape as shown in FIG. 1. Therefore, when the double-sided adhesive tape 5 is attached to an artificial nail 1 having a curved shape, air enters between the double-sided adhesive tape 5 and the artificial nail 1 to form a bubble layer B so that the area where the double-sided adhesive tape 5 is adhered to the artificial nail 1 decreases. Therefore, the adhesive force which maintains a state where the double-sided adhesive tape 5 is attached to the artificial nail 1 is deteriorated. In addition, during a process where the double-sided adhesive tape 5 is attached to the artificial nail 1, an amount of wrinkle W generated at the double-sided adhesive tape 5 further increases at the curved portion of the artificial nail 1, or the area of the bubble layer B increases. Further, since a restoring force is generated at the double-sided adhesive tape 5 by the release tape 4, the wrinkle W is generated more seriously. In addition, since the release tape 4 attached to the double-sided adhesive tape 5 also has an inertia for maintaining the planar shape, the release tape 4 tends to detach from the double-sided adhesive tape 5 during the process, which is called a pop-up phenomenon. In addition, even though the release tape 4 maintains a state of being attached to the double-sided adhesive tape 5, in a case where the release tape 4 has a greater inertia of maintaining a planar shape than the double-sided adhesive tape 5, the release tape 4 applies a force to make the double-sided adhesive tape 5 planar, and as time goes, a gap is generated between the artificial nail 1 and the double-sided adhesive tape 5.

Therefore, there is recently a need for a one-touch artificial nail, which may apply glossiness and design of a nail polish to a nail, may be easily attached to a nail even by a beginner, may maintain an adhesive force even though being applied to an artificial nail having a curved shape, may prevent a pop-up phenomenon of a release tape, and may minimize sticking of impurities.

SUMMARY

An embodiment of the present disclosure is directed to providing a one-touch artificial nail, which takes a shortest time in decorating a nail, allows adhesion to a nail without bubble or wrinkle, prevents a pop-phenomenon of a release tape, and minimizes sticking of impurities.

In one general aspect, there is provided an artificial nail, which comprises a nail body; a design layer formed at an upper portion of the nail body; a double-sided adhesive tape body formed at a lower portion of the nail body; and a release tape located at a lower portion of the double-sided adhesive tape body, wherein the nail body includes a first end to be located adjacent to a free edge side of a nail, a second end to be located adjacent to a cuticle side of the nail, and an adhesive surface formed at a location facing the nail, wherein the double-sided adhesive tape body includes a plurality of non-connecting portions where a plurality of first cutting lines are formed, and connecting portions formed between the first cutting lines so that the plurality of non-connecting portions are not separated off from each other, wherein the double-sided adhesive tape body is formed at the lower portion of the nail body except for a non-cohesive rim portion of the lower portion of the nail body; the non-cohesive rim portion includes a first non-cohesive rim portion at the first end of the nail body, a second non-cohesive rim portion at the second end of the nail body, and two side non-cohesive rim portions at both sides of the nail body; the first non-cohesive rim portion corresponds to $\frac{1}{3}$ to $\frac{1}{50}$ of the length between the first and the second ends of the nail body; the non-cohesive rim portion corresponds to $\frac{1}{7}$ to $\frac{1}{100}$ of the length between the first and the second ends of the nail body; and each of the side non-cohesive rim portions corresponds to $\frac{1}{5}$ to $\frac{1}{100}$ of the length between the both side ends of the nail body, and wherein the release tape has a greater area than the double-sided adhesive tape body so that the release tape covers the entire surface of the double-sided adhesive tape body; a plurality of second cutting lines are provided at the release tape to pass through the release tape; and the release tape has a grip connecting to and protruding from the outer circumference at one end of the nail body According to one embodiment of the present disclosure, the second cutting lines are preferably formed at the same locations as the plurality of first cutting lines in a vertical direction.

In addition, the one-touch artificial nail may further include a coating layer provided at the upper portion of the design layer, and the adhesive force of the coating layer and the ink applied to the design layer is preferably 30% or less as a result of a coating adhesive force test by ASTM D3359.

Here, the coating layer preferably has glossiness of 50 or above as a result of a glossiness test by ASTM D523.

In addition, the coating layer preferably has hardness of 1B or above as a result of a pencil hardness test by ASTM D3363.

In addition, the double-sided adhesive tape body preferably has a peeling strength of 300 gf/10 mm or above as a result of a 180° peeling strength test using SUS by ASTM D903.

In addition, the double-sided adhesive tape body preferably has a peeling strength of 100 gf/10 mm or above as a result of a 90° peeling strength test using ABS by ASTM D903.

In addition, the second cutting line is preferably formed to extend till the outer circumference of the release tape.

In addition, the release tape preferably has a tensile strength of 5 kg/cm$^2$ or above.

In addition, the release tape preferably has a thickness of 30 μm to 300 μm.

In addition, the double-sided adhesive tape body preferably has a thickness of 150 μm to 800 μm.

In addition, the release tape preferably has a releasing force of 5 gf/50 mm to 500 gf/50 mm.

In addition, the release tape is preferably made of any one of PE, EVA, PP, POE, and PET, or their copolymers or blends.

In addition, the double-sided adhesive tape body preferably includes a substrate layer, and cohesive layers respectively coupled to upper and lower portions of the substrate layer.

In addition, the cohesive layer may include a first cohesive layer located at the upper portion of the substrate layer and a second cohesive layer located at the lower portion of the substrate layer, and the first cohesive layer and the second cohesive layer preferably have different cohesive forces.

In addition, the substrate layer is preferably made of any one of PET, PE, PP, EVA, POE, and non-woven fabric.

According to the present disclosure, since the one-touch artificial nail may be attached to an artificial nail without bubbles or winkles, it is possible to prevent the adhesive area from decreasing, thereby improving the cohesive force. Therefore, the one-touch artificial nail may be easily applied to wearers having different nail curvatures. In addition, since the one-touch artificial nail does not separate due to wrinkles, it is possible to prevent hair or impurities from being caught between the one-touch artificial nail and the artificial nail and to improve wear sensation.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
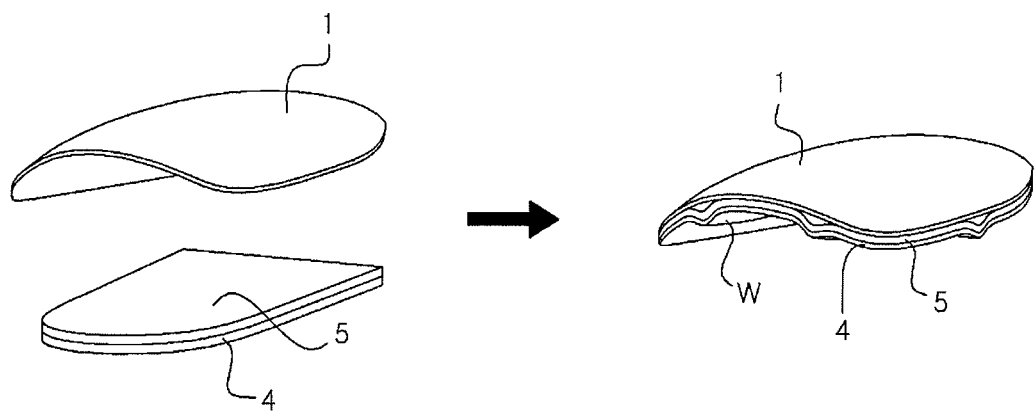
FIGS. 1a and 1b are a perspective view and a cross-sectional view showing a general one-touch artificial nail applied to an artificial nail.
Figure 1:
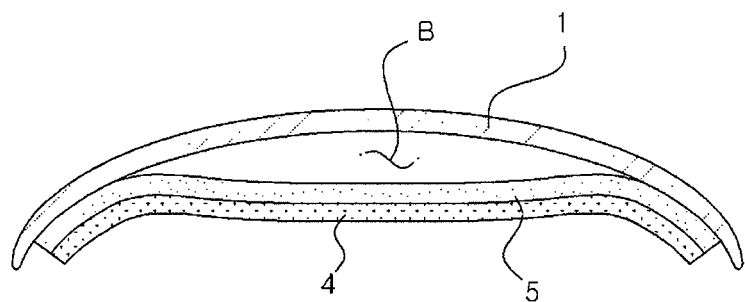

Hereinafter, exemplary embodiments will be described in detail with reference to the accompanying drawings. However, these embodiments are just for illustrating the present disclosure in more detail, and it is apparent to those having ordinary skill in the art that the present disclosure is not limited to these embodiments.

The one-touch artificial nail according to the present disclosure generally includes an artificial nail unit 200 having a nail body 210 substituting for the shape of a nail and a design layer 220, and a double-sided adhesive tape body 110 and a release tape 120 used for attaching the artificial nail unit 200 to the nail. A first cutting line 114 and a second cutting line 124 are respectively formed at the double-sided adhesive tape body 110 and the release tape 120. The first cutting line 114 and the second cutting line 124 are respectively formed through the double-sided adhesive tape body 110 and the release tape 120. Therefore, when the double-sided adhesive tape body 110 and the release tape 120 having a planar shape are attached to the nail body 210 having a curved shape, air located between the nail body 210 and the double-sided adhesive tape body 110 is discharged out through the first cutting line 114 and the second cutting line 124. Therefore, the area where the double-sided adhesive tape for an artificial nail contacts the artificial nail increases, and a cohesive force is improved than the existing case. Further, since the first cutting line 114 and the second cutting line 124 are formed with a linear shape, the rigidity of the double-sided adhesive tape may be maintained. In other words, during a process where the release tape 120 is detached from the double-sided adhesive tape body 110, it is possible to prevent the double-sided adhesive tape body 110 from being torn. In addition, since the area of the release tape 120 is greater than the area of the double-sided adhesive tape body 110, it is possible to prevent impurities from being stuck to the double-sided adhesive tape.

Figure 2:
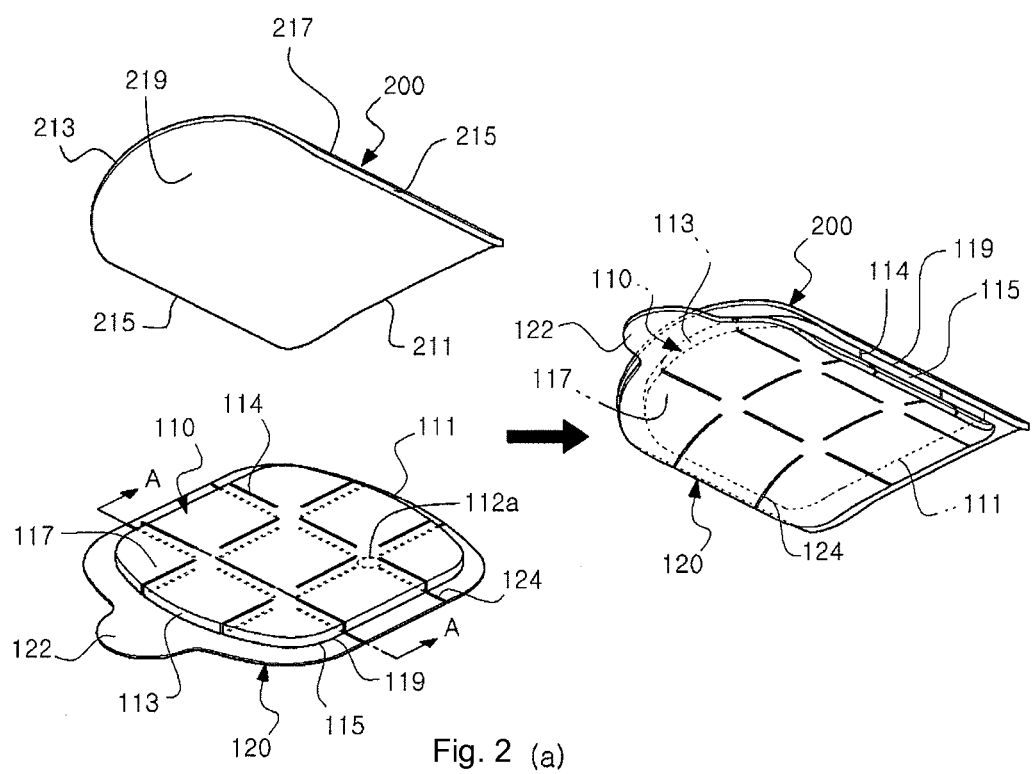
FIGS. 2a and 2b are a perspective view and a cross-sectional view showing a one-touch artificial nail according to an embodiment of the present disclosure applied to an artificial nail.
Figure 2:
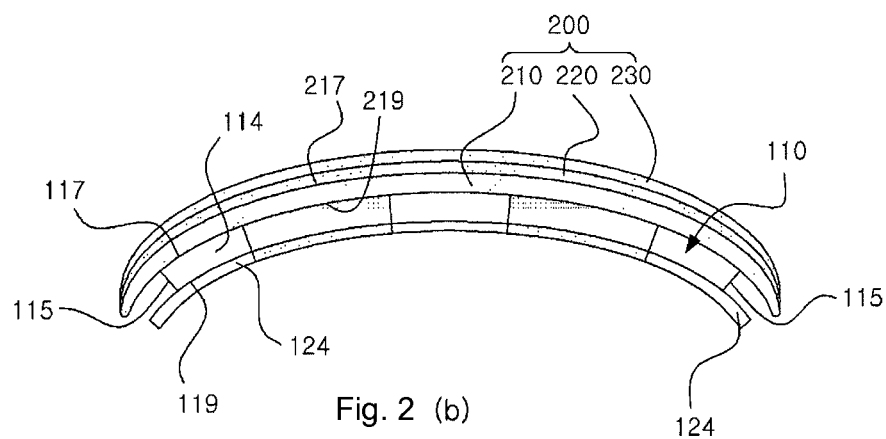
Figure 3:
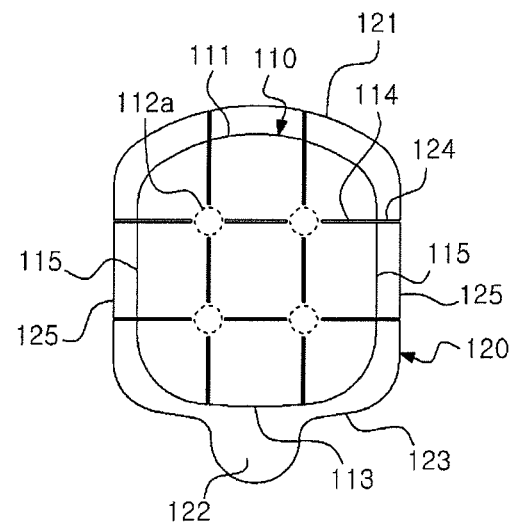
FIGS. 3a to 3c are front views showing various embodiments of the one-touch artificial nail according to the present disclosure.
Figure 3:
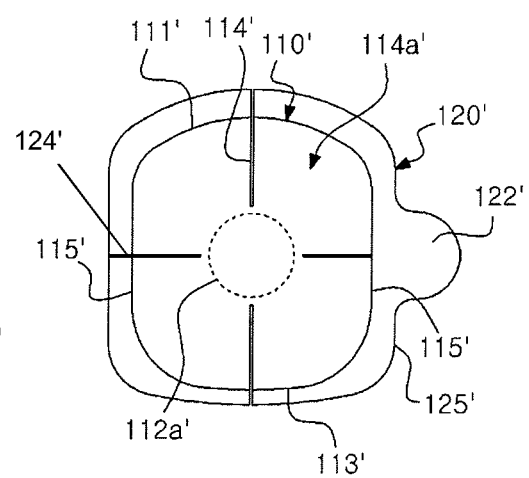
Figure 3:
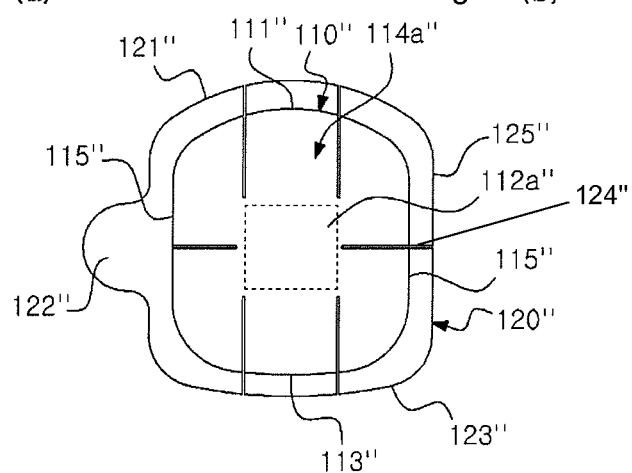

FIGS. 2a and 2b are a perspective view and a cross-sectional view showing a one-touch artificial nail according to an embodiment of the present disclosure, and FIGS. 3a to 3c are front views showing various embodiments of the one-touch artificial nail according to the present disclosure.

The one-touch artificial nail according to the present disclosure, as shown in FIGS. 2a and 2b, the one-touch artificial nail includes a nail body 210, design layers 220 formed at the upper portion of the nail body 210, a double-sided adhesive tape body 110 formed at the lower portion of the nail body 210, and a release tape 120 located at the lower portion of the double-sided adhesive tape body 110.

The nail body 210 includes a one end 211 coupled to be located at a free edge side of the nail, the other end 213 coupled to be located at a cuticle side of the nail, and an adhesive surface 219 formed at a location facing the nail.

The double-sided adhesive tape body 110 includes a plurality of non-connecting portions 114a formed by cutting a plurality of first cutting lines 114, and a connecting portion 112a formed between the first cutting lines 114 so that the plurality of non-connecting portions 114a are not separated from each other.

The double-sided adhesive tape body 110 is formed except for a non-cohesive portion at the lower rim of the nail body 210; the non-cohesive portion includes a non-cohesive portion at one end 211 of the nail body 210, a non-cohesive portion at the other end 213 of the nail body 210, and a non-cohesive portion at both sides 215 of the nail body 210; the non-cohesive portion at one end 211 of the nail body 210 is a portion corresponding to $1/3$ to $1/50$ of the nail length from one end 211 of the nail body 210; the non-cohesive portion at the other end 213 of the nail body 210 is a portion corresponding to $1/7$ to $1/100$ of the nail length from the other end 213 of the nail body 210; and the non-cohesive portion at both sides 215 of the nail body 210 is a portion corresponding to $1/5$ to $1/100$ of the nail length from both side ends 215 of the nail body 210.

The release tape 120 has a greater area than the double-sided adhesive tape body 110 and the double-sided adhesive tape body is attached to the upper portion of the release tape 120 so that the double-sided adhesive tape body 110 is not deviated from the release tape 120; a plurality of second cutting lines 124 are provided at the release tape 120 to pass through the upper and lower surfaces of the release tape 120; and the release tape 120 has a grip 122 connecting to and protruding from the outer circumference at one end 211 of the nail body 210.

The nail body 210 corresponds to a nail shape and gives a regular nail shape to a wearer so that the overall shape of the nail of the wearer may be improved. A design layer 220 painting a design to the nail body 210 is formed at the upper surface 217 of the nail body 210 which gives such an improved nail shape. In other words, if the nail body 210 gives an improved nail shape, the design layer 220 gives a painting effect using a nail polish or the like to the nail. A coating layer 230 may be further provided to the upper portion of the design layer 220 in order to protect the surface and to enhance the glossiness which improves the appearance of the design.

When the one-touch artificial nail according to the present disclosure is manufactured, if all of the following conditions are not satisfied simultaneously, defects may be generated due to the separation of the release tape during an automated manufacturing process. In addition, during the process of attaching the artificial nail unit, a problem may occur in separation of the release tape, and, it has been also found that impurities are stuck to the artificial nail unit after the artificial nail unit is attached.

In other words, i) among the non-cohesive portion at the lower rim of the nail body 210, the non-cohesive portion located at one end 211 of the nail body 210 should be separated by $1/3$ to $1/50$ of the length of the nail body 210 from one end 211 of the nail body 210, ii) the non-cohesive portion at the other end 213 of the nail body 210 should be separated by $1/7$ to $1/100$ of the length of the nail body 210 from the other end 213 of the nail body 210, and iii) the non-cohesive portion located at both sides 215 of the nail body 210 should be respectively separated by $1/5$ to $1/100$ of the width of the nail body 210 from both sides 215 of the nail body 210. In addition, iv) the release tape 120 should have a greater area than the double-sided adhesive tape body 110 and the double-sided adhesive tape body should be attached to the upper portion of the release tape 120 so that the double-sided adhesive tape body 110 is not deviated from the release tape 120, v) second cutting lines 124 formed at the same locations as the plurality of first cutting lines 114 in a vertical direction should be provided at the release tape 120, and vi) the release tape 120 should have a grip 122 connecting at and protruding from the outer circumference at one end 211 of the nail body 210.

Here, the cohesive force of the coating layer 230 and the ink applied to the design layer 220 is preferably 30% or less, as a test result of ASTM D3359 using a cross cut. In other words, the area of the ink and the coating layer 230 detached after the test is preferably 30% or less. In case of an external force applied to the nail during ordinary life, a person cannot recognize an impact before the nail is broken or a scratch is created at the nail. In other words, since a person does not feel a pain by an external force generating at ordinary life, even though the person senses that an external force is received, the person does not come to a perception stage where the user takes separate actions, such as stopping a current behavior or checking a portion where the external force is applied. In other words, in a case where the cohesive force exceeds 30%, even though an external force is continuously applied to the nail during ordinary life, the external force cannot be recognized. Therefore, the external force as large as peeling off the ink and the coating layer 230 is continuously and repeatedly applied to the one-touch artificial nail. Therefore, the cohesive force of the coating layer 230 and the ink applied to the design layer 220 according to the present disclosure is preferably set to be 30% or less so that the coating layer 230 and the ink applied to the design layer 220 may be protected from the external force.

In addition, when an external force less than 1B based on pencil hardness is applied to the nail, the impact is generally not recognized. In other words, only when a scratch is created at the nail due to an external force of 2.5 or above in Mohs hardness, a person recognizes the external force and stops his/her behavior so as to stop the creation of a scratch. As a result of the pencil hardness test by ASTM D3363, the hardness of the coating layer 230 according to the present disclosure is preferably 1B or above. In other words, when an external force less than 1B based on pencil hardness is applied to the coating layer 230 at ordinary life, a scratch is not created. At this time, in a case where the hardness of the coating layer 230 is less than 1B, if an external force less than 1B based on pencil hardness is applied to the coating layer 230 at ordinary life, a scratch is created at the coating layer 230 to deteriorate the appearance of the one-touch artificial nail. Therefore, the hardness of the coating layer 230 is preferably 1B or above so that the appearance of the one-touch artificial nail may be maintained while keeping ordinary life.

In addition, according to a glossiness test result by ASTM D532, the glossiness of the coating layer 230 is preferably 50 or above. Generally, the surface of the nail is minutely curved. Therefore, in a case where glossiness is applied thereto, the surface of the nail may be smoothly arranged and look to be even. For these effects, the coating layer 230 according to the embodiment of the present disclosure preferably has glossiness of 50 or above. In a case where the glossiness is less than 50, even though the surface is actually formed smooth, the surface of the nail body 210 is observed as being curved as if fine scratches are created. Therefore, in order to improve the appearance of the nail, in a case where an artificial nail is attached, the glossiness is preferably 50 or above.

The second cutting line 124 is formed at the release tape 120 to pass through the release tape 120. Since the first cutting line 114 and the second cutting line 124 cut a partial region of the double-sided adhesive tape body 110 and the release tape 120 formed with a planar shape, the inertia by which the double-sided adhesive tape body 110 and the release tape 120 applied to the artificial nail and the nail having a curved shape tend to recover a planar shape may be dispersed. Therefore, the state where the double-sided adhesive tape body 110 applied to the curved surface may continuously maintain its adhered state to the nail body 210 by the first cutting line 114 and the second cutting line 124.

Since the double-sided adhesive tape body 110 and the release tape 120 are applied to the nail body 210, their outer circumferential shapes also correspond to the shapes of the nail body 210 and the nail. In other words, the name of the outer circumference of the double-sided adhesive tape body 110 changes depending on its location when being applied to the nail. Here, the outer circumference designates only a rim of the nail shape, and the regions divided by the first cutting line 114 and the second cutting line 124 do not correspond to the outer circumference. In other words, considering that the side surface 115 of the double-sided adhesive tape body 110 is divided by the first cutting line 114, the outer circumference of the side surface 115 does not have a "T" shape but has a "-" shape. One end 111 of the double-sided adhesive tape body 110 is located at the free edge side of the nail, and the other end 113 is located at the cuticle side. In addition, the side surface 115 is arranged to be located at the nail surface (nail wall) side of the nail. The nail body 210 is attached to the upper surface 117 of the double-sided adhesive tape body 110, and the nail is attached to the lower surface 119. At this time, before the double-sided adhesive tape body 110 is attached to the nail, the release tape 120 is detachably coupled to the lower surface 119 of the double-sided adhesive tape body 110. Therefore, at the adhesive surface 219 of the nail body 210, as shown in FIG. 2a, the double-sided adhesive tape body 110 and the release tape 120 formed with a flat plate shape are attached.

The first cutting line 114 and the second cutting line 124 may be installed at different locations depending on properties of the double-sided adhesive tape body 110 and the release tape 120. However, in order to prevent a gap from being created between the double-sided adhesive tape body 110 and the nail body 210, the second cutting line 124 may be formed at the same locations as the plurality of first cutting lines 114 in the vertical direction. Here, the first cutting line 114 formed at the double-sided adhesive tape body 110 and the second cutting line 124 formed at the release tape 120 not only disperse the inertia to restore their planar shape but also play a role of smoothly discharging the air between the double-sided adhesive tape body 110 and the nail body 210 during the process where the double-sided adhesive tape body 110 is attached to the nail body 210. The nail body 210 has a curved shape, and the double-sided adhesive tape body 110 has a planar shape. Therefore, in order to attach the double-sided adhesive tape body 110 having a planar shape to the nail body 210, the side surface 115 of the double-sided adhesive tape body 110 firstly contacts the side 215 of the nail body 210. By doing so, when the double-sided adhesive tape body 110 having a planar shape is attached to the nail body 210, a bubble layer is inevitably created between the double-sided adhesive tape body 110 and the nail body 210. In the present disclosure, in order to solve this problem, the air in the bubble layer may be discharged out by means of the first cutting line 114 and the second cutting line 124. In particular, by coinciding the locations whether the first cutting line 114 and the second cutting line 124 are formed, it is possible to restrain the creation of a gap between the one-touch artificial nail and the artificial nail. In other words, as shown in FIG. 2b, in a case where the locations where the first cutting line 114 and the second cutting line 124 are formed are the same, the air located between the double-sided adhesive tape body 110 and the nail body 120 may be easily discharged while passing through the first cutting line 114 and the second cutting line 124 in order.

In addition, since the release tape 120 is provided to have a grater area than the double-sided adhesive tape body 110, it is possible to decrease the exposure of the double-sided adhesive tape body 110 to the minimum. For example, in a case where the release tape 120 is made to have the same area as the double-sided adhesive tape body 110, the side surface 115 of the double-sided adhesive tape body 110 is entirely exposed so that impurities are stuck to the side surface 115 of the double-sided adhesive tape body 110. In addition, if the double-sided adhesive tape body 110 is compressed as temperature increases and flexibility increases, its thickness may be somewhat reduced and its area may be increased simultaneously. Even though temperature does not increase, when a pressure is applied thereto during the process, the area may be increased even instantly. As described above, the area of the release tape 120 is greater than the area of the double-sided adhesive tape 110 so as to prevent the double-sided adhesive tape body 110 from exposing outwards in advance. Further, if the release tape 120 is formed to have a great area, the release tape 120 may be clearly divided from the double-sided adhesive tape body 110. Therefore, even though the double-sided adhesive tape body 110 is not gripped by a hand, the release tape 120 may be detached. Therefore, the cohesive force of the double-sided adhesive tape body 110 may be maintained, and since the double-sided adhesive tape body 110 needs not to be compressed, the thickness of the cohesive surface may be maintained consistently. As shown in FIGS. 3a to 3c, since the grips 122, 122', 122" are formed at the release tapes 120, 120', 120" to protrude with the same planar shape on the outer circumferences of the release tapes 120, 120', 120" having a nail shape, the release tapes 120, 120', 120" may be more easily detached from the double-sided adhesive tape body 110. At this time, the grips 122, 122', 122" protrude from the outer circumference of the artificial nail unit 200 so that the location of the grip may be checked at a glance even though the artificial nail unit 200 is located at the upper portion and thus the location of the double-sided adhesive tape body 110 is not checked by the naked eyes.

The cut number of the first cutting lines 114, 114', 114" and the second cutting lines 124. 124', 124" respectively formed at the double-sided adhesive tape bodies 110, 110', 110" and the release tapes 120, 120', 120" may be changed according to the curvature and size of the nail body 210. In other words, if a curvature is so large that a great restoring force is applied to the release tape 120, as shown in FIG. 3a, a first cutting line 114 and a second cutting line 124 may be additionally formed at the inside separated from the double-sided adhesive tape body 110 and the outer circumference of the release tape 120. In addition, as shown in FIGS. 3b and 3c, connecting portions 112a' and 112a" may be formed at only one point in the double-sided adhesive tape bodies 110' and 110" and the release tapes 120' and 120" so that the first cutting lines 114' and 114" and the second cutting lines 124' and 124" are respectively formed outwards in a radial direction based on the connecting portions 112a' and 112a". Here, the second cutting lines 124, 124', 124" formed at the same locations as the first cutting lines 114, 114', 114" may be formed to extend till the outer circumferences of the release tapes 120, 120', 120". In other words, by extending the second cutting lines 124, 124', 124" till the outer circumferences of the release tapes 120, 120', 120", the release tapes 120, 120', 120" may be not restored in the planar direction. In addition, the second cutting line may be formed at a location of the release tape other than the location where the first cutting line is formed.

Here, the second cutting lines 124, 124', 124" are preferably not formed on the outer circumferences at locations where the grips 122, 122', 122" are formed. In other words, when the grips 122, 122', 122" are gripped and the release tapes 120, 120', 120" are detached, the release tapes 120, 120', 120" may be easily detached from the double-sided adhesive tape bodies 110, 110', 110" by enhancing the rigidity of the locations where the grips 122, 122', 122" are formed. For example, in a case where the grip 122 is formed at the other end 123 of the release tape 120, the second cutting line 124 is not formed to extend to the other end 123 of the release tape 120, while, in a case where the grips 122' and 122" are formed at the sides 125' and 125" of the release tapes 120' and 120", the second cutting lines 124' and 124" are not formed to extend to the sides 125' and 125" of the release tapes 120' and 120". In a case where the second cutting lines 124, 124', 124" are provided in the outer circumferences at the locations where the grips 122, 122', 122" are formed, the force applied in the moving direction of the grips 122, 122', 122" is focused at the second cutting lines 124, 124', 124" to prevent the connecting portions 112a, 112a', 112a" formed at the release tapes 120, 120', 120" from being broken and thus prevent the release tapes 120, 120', 120" from being divided into several parts. Therefore, the second cutting lines 124, 124', 124" are preferably separated from the outer circumferences at the locations where the grips 122, 122', 122" are formed.

In addition, even though the area of the double-sided adhesive tape body 110 instantly changes as described above during the process, properties of the release tape 120 may be set so that sticking of impurities to the double-sided adhesive tape body 110 may be prevented to maintain the cohesive force.

Figure 4:
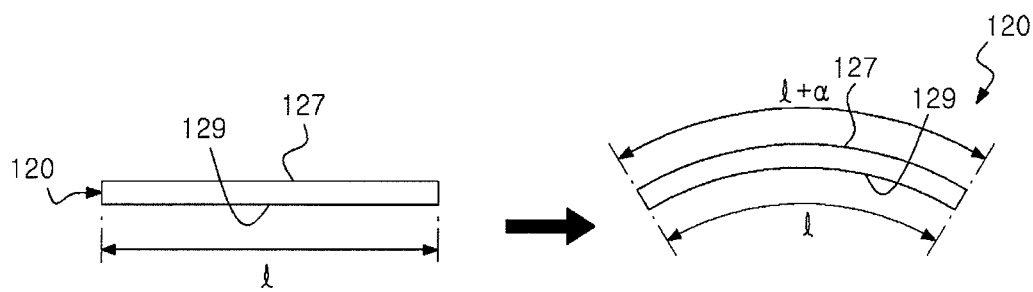
FIGS. 4a and 4b are partial cross-sectional views showing the one-touch artificial nail according to an embodiment of the present disclosure.
Figure 4:
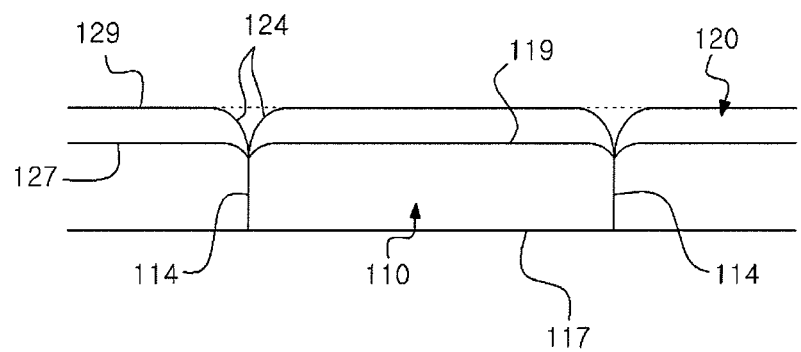

FIGS. 4a and 4b are partial cross-sectional views showing the one-touch artificial nail according to an embodiment of the present disclosure.

First, if the double-sided adhesive tape body 110 becomes flat by an external force such as pressure, the release tape 120 may also be elongated according to the shape change of the double-sided adhesive tape body 110. Therefore, it is possible to prevent the cohesive component of the double-sided adhesive tape body 110 from exposing out of the release tape 120 in the radial direction, and it is possible to prevent the release tape 120 and the double-sided adhesive tape body 110 from peeling off. In other words, since the release tape 120 and the double-sided adhesive tape body 110 may cope with the external force in the same way, the peeling caused by the different actions against external force may be prevented. First, as shown in FIG. 4a, if the release tape 120 is applied to the curved surface, the length of the upper surface 127 of the release tape 120 increases so that the release tape 120 may be smoothly applied to the curved surface along the double-sided adhesive tape body 110. Therefore, it is possible to prevent the double-sided adhesive tape body 110 and the release tape 120 from peeling off.

In addition, as shown in FIG. 4b, a part of the release tape 120 at the location where the second cutting line 124 is formed may be inserted between the first cutting lines 114 to enhance a coupling force between the release tape 120 and the double-sided adhesive tape body 110. When the first cutting line 114 and the second cutting line 124 are formed at the same location, the cutting lines are formed simultaneously by using a single cutter. In this process, a part of the release tape 120 is instantly inserted between the first cutting lines 114 and a part of the release tape 120 is fixed to the double-sided adhesive tape body 110. However, since the release tape 120 has a releasing property against the double-sided adhesive tape body 110, the release tape 120 is not perfectly adhered to the double-sided adhesive tape body 110 during this process. Therefore, by controlling physical properties of the release tape 120, it is preferred to manufacture the release tape 120 having a releasing property against the double-sided adhesive tape body 110 and not popping up from the double-sided adhesive tape body 110 due to a restoring force.

For this purpose, the release tape 120 may be made of any one of PE, EVA, PP, POE, and PET, or their copolymers or blends.

In addition, the release tape 120 preferably has a tensile strength of 5 kg/cm$^2$ or above. The tensile strength is a maximum stress until a test piece is broken due to a tensile load and represents a value obtained by dividing the maximum load till the breakage by an original cross section. Here, the release tape 120 is formed to require a force of 5 kg/cm$^2$ or above for entire breakage, thereby preventing the release tape 120 from being torn during a process where the release tape 120 is detached. The double-sided adhesive tape body 110 applied to the one-touch artificial nail according to the present disclosure uses a force less than 5 kg/cm$^2$ to detach the release tape 120. Therefore, in a case where the tensile strength of the release tape 120 is less than 5 kg/cm$^2$, during the process where the release tape 120 is detached, the release tape 120 is torn so that residuals of the release tape 120 remain in the double-sided adhesive tape body 110. In this case, during the process where residuals of the release tape 120 are removed by hands, if the oil of the hands contacts the lower surface 119 of the double-sided adhesive tape body 110, the cohesive force of the double-sided adhesive tape body 110 is deteriorated so that the one-touch artificial nail loses its original role. In addition, even though residuals of the release tape 120 are treated by using another tool, if the double-sided adhesive tape body 110 is pressed during the residual removing process, the surface of the double-sided adhesive tape body 110 becomes uneven so that the cohesive force of the double-sided adhesive tape body 110 may not be evenly applied to the nail. Therefore, the performance of the one-touch artificial nail may not be implemented. In other words, the release tape 120 according to the present disclosure has a tensile force of 5 kg/cm$^2$ or above in order to prevent residuals of the release tape 120 from remaining in the double-sided adhesive tape body 110 and to maintain the cohesive property of the double-sided adhesive tape body 110 uniformly.

In addition, when the release tape 120 is made of the above materials, the thickness of the release tape 120 is preferably 30 μm to 300 μm. If the thickness of the release tape 120 is less than 30 μm, the rigidity of the release tape 120 is deteriorated, and so the release tape 120 is torn when the release tape 120 is detached from the double-sided adhesive tape body 110. Therefore, a part of the release tape 120 inevitably remains in the double-sided adhesive tape body 110. In particular, in a case where the double-sided adhesive tape body 110 has the cohesive force for attachment to the nail, the release tape 120 is inevitably broken since the stress is focused at the point of the second cutting line 124 formed at the same position of the first cutting line 114 even though the releasing force of the release tape 120 is maximized. In other words, regardless of the releasing force of the release tape 120, the thickness of the release tape 120 should be 30 μm or above. In addition, in a case where the thickness of the release tape 120 exceeds 300 μm, since the inertia by which the release tape 120 restores a planar shape increases, a pop-up phenomenon occurs at the release tape 120. In addition, in a case where the releasing force decreases to restrain the pop-up phenomenon of the release tape 120, the attaching force between the release tape 120 and the double-sided adhesive tape body 110 increases so that the double-sided adhesive tape body 110 receives a force restoring a planar shape by the release tape 120. Therefore, a gap is inevitably created between the double-sided adhesive tape body 110 and the artificial nail. In addition, if the releasing force decreases, the release tape 120 may not be easily removed from the double-sided adhesive tape body 110, and so the original purpose of the present disclosure is lost. Therefore, regardless of the releasing force, the thickness of the release tape 120 should be 30 μm to 300 m in order to easily detach the release tape 120 from the double-sided adhesive tape body 110 and prevent the pop-up phenomenon.

Figure 5:
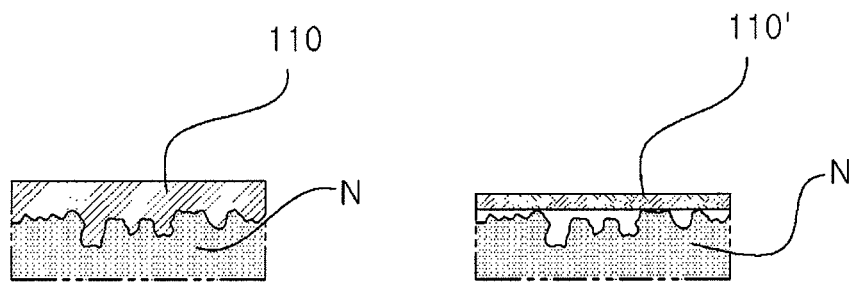
FIGS. 5a and 5b are cross-sectional views showing a double-sided adhesive tape body applied to the nail according to an embodiment of the present disclosure and a comparative example.

FIGS. 5a and 5b are cross-sectional views showing a double-sided adhesive tape body applied to the nail according to an embodiment of the present disclosure and a comparative example.

In order to improve the cohesive force for coupling the upper surface 117 and the lower surface 119 of the double-sided adhesive tape body 110 respectively to the nail body 210 and the nail, many methods may be practically used other than improving the cohesive force of the double-sided adhesive tape body 110. First, in order to improve the cohesive force of the double-sided adhesive tape body 110, a gap should not be created between the double-sided adhesive tape body 110 and the nail body 210. In addition, the cohesive force between the nail N and the double-sided adhesive tape body 110 may be improved by forming the double-sided adhesive tape body 110 over a predetermined thickness.

In the present disclosure, in order to prevent impurities from entering between the artificial nail body and the nail and to maintain a state where the one-touch artificial nail is attached to the nail, the double-sided adhesive tape body 110 is preferably formed to have a thickness of 150 to to 800 μm. In other words, in a case where the thickness of the double-sided adhesive tape body 110 is 150 μm to 800 μm, as shown in FIG. 5a, the cohesive component of the double-sided adhesive tape body 110 is uniformly applied to the surface of the nail to exhibit a cohesive force on the surface of the nail. In addition, since the cohesive component is uniformly distributed between rough surfaces of the nail, the artificial nail may be engaged with the nail. Therefore, the artificial nail may be attached to the nail for a long time.

However, in a case where the thickness of the double-sided adhesive tape body 110 is less than 150 μm, as shown in FIG. 5b, the double-sided adhesive tape body 110 is adhered only to protruding portions of the nail, and so the area where the double-sided adhesive tape body 110 is cohered greatly decreases. Moreover, if simple adhesion by oil of the nail is used without the engagement of the nail, the double-sided adhesive tape body 110 may not be attached to the nail. Therefore, the thickness of the double-sided adhesive tape body 110 is preferably 150 μm or above.

In addition, in a case where the thickness of the double-sided adhesive tape body 110 exceeds 800 μm, the gap between the nail and the artificial nail increases so that hairs or impurities are caught therein so that the cohesive force of the double-sided adhesive tape body 110 decreases further. Further, in a case the hair is touched by the hand, the hair is cohered to the double-sided adhesive tape body 110. And, while the hair is detached, a pain is caused, and the wear sensation is deteriorated. Therefore, the thickness of the double-sided adhesive tape body 110 is preferably 150 μm to 800 μm.

In addition, since the double-sided adhesive tape body 110 plays a role of coupling the nail with the nail body 210 of the one-touch artificial nail, when the location of the nail body 210 relatively changes with respect to the nail, the double-sided adhesive tape body 110 should not peel off. In other words, when an external force is applied to remove the one-touch artificial nail from the nail, the double-sided adhesive tape body 110 should not partially remain on the nail. For this purpose, as a result of the 180° peeling strength test using SUS by ASTM D903, the peeling strength of the double-sided adhesive tape body 110 is preferably 300 gf/10 mm or above. In addition, as a result of the 90° peeling strength test using ABS, the peeling strength of the double-sided adhesive tape body 110 is preferably 100 gf/10 mm or above. In other words, in a case where the double-sided adhesive tape body 110 is manufactured to have a peeling strength less than 300 gf/10 mm at the 180° peeling strength test using SUS, if a shearing force is applied in the plane direction of the double-sided adhesive tape body 110 during ordinary life, the nail body 210 is detached in a state where the double-sided adhesive tape body 110 is partially adhered to the nail. In addition, during the process where the one-touch artificial nail is detached for exchange, the double-sided adhesive tape body 110 may peel off to remain residuals. Similarly, in a case where the double-sided adhesive tape body 110 is manufactured to have a peeling strength less than 100 gf/10 mm at the 90° peeling strength test using ABS, if an external force is applied in a direction perpendicular to the plane of the double-sided adhesive tape body 110 during ordinary life, the nail body 210 is detached in a state where the double-sided adhesive tape body 110 is partially adhered to the nail. In other words, if an external force is applied to the nail body 210 toward the upper surface 217, the nail body 210 is detached in a state where the double-sided adhesive tape body 110 is partially adhered to the nail. Further, during the process where the one-touch artificial nail is detached for exchange, the double-sided adhesive tape body 110 also peels off to remain residuals on the nail. Therefore, it is preferred to manufacture the double-sided adhesive tape body 110 having a peeling strength of 300 gf/10 mm or above at the 180° peeling strength test using SUS by ASTM D903, and a peeling strength of 100 gf/10 mm or above at the 90° peeling strength test using ABS.

Figure 6:
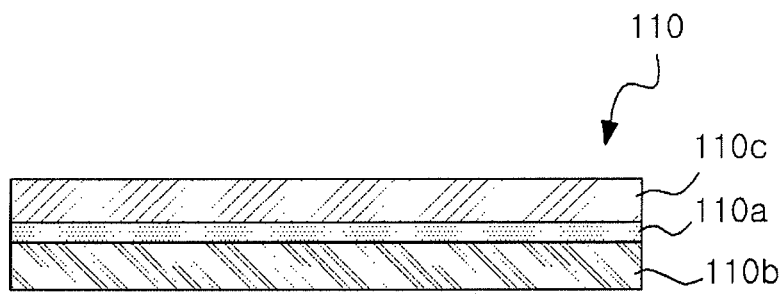
FIG. 6 is a cross-sectional view showing a double-sided adhesive tape body according to another embodiment of the present disclosure.

FIG. 6 is a cross-sectional view showing a double-sided adhesive tape body according to another embodiment of the present disclosure.

The double-sided adhesive tape body 110 applied to the one-touch artificial nail according to the present disclosure may be provided in a single layer or a laminate structure where a plurality of layers is laminated. In particular, in a case where the double-sided adhesive tape body 110 is formed in plural layers, in order to prevent the other end 213 of the nail body 210 from compressing the cuticle even though an external force is applied to one end 211 of the nail body 210, the double-sided adhesive tape body 110 preferably includes a substrate layer 110a, and cohesive layers 110b and 110c respectively coupled to upper and lower portions of the substrate layer 110a. Here, the substrate layer 110a may be made of any one of PET, PE, PP, EVA, POE, and non-woven fabric. The substrate layer 110a allows the cohesive layers formed at the upper and lower portions of the substrate layer 110a not to be pushed due to material characteristics when a force parallel to the plane is received. Therefore, even though ordinary behaviors are performed after the one-touch artificial nail is worn, the cuticle is not compressed, thereby not generating a pain. In addition, the first cohesive layer 110b and the second cohesive layer 110c respectively located at the upper and lower portions of the substrate layer 110a may have the same adhesive force and the same material, but they may have different adhesive characteristics. In a case where adhesive characteristics are different, the first cohesive layer 110b and the second cohesive layer 110c may be optimally made of material capable of enhancing an adhesive force with the nail and material capable of enhancing an adhesive force with the nail body 210 so that the one-touch artificial nail may be attached to the nail for a long time.

Simple changes or modifications of the present disclosure may be easily made by those having ordinary skill in the art,

| Reference Symbols | |
|---|---|
| 110: double-sided adhesive tape body | 111: one end |
| 112a: connecting portion | 113: the other end |
| 114: first cutting line | 114a', a'': non-connecting portion |
| 115: side surface | 117: upper surface |
| 119: lower surface | 120: release tape |
| 124: second cutting line | 210: nail body |
| 211: one end | 213: the other end |
| 215: side surface | 217: upper surface |
| 219: adhesive surface | 220: design layer |
| 230: coating layer | |

What is claimed is:

1. An artificial nail, comprising:
a nail body;
a design layer formed at an upper portion of the nail body;
a double-sided adhesive tape body formed at a lower portion of the nail body; and
a release tape located at a lower portion of the double-sided adhesive tape body,
wherein the nail body includes a first end to be located adjacent to a free edge side of a nail, a second end to be located adjacent to a cuticle side of the nail, and an adhesive surface formed at a location facing the nail,
wherein the double-sided adhesive tape body includes a plurality of non-connecting portions where a plurality of first cutting lines are formed, and connecting portions formed between the first cutting lines so that the plurality of non-connecting portions are not separated off from each other,
wherein the double-sided adhesive tape body is formed at the lower portion of the nail body except for a non-cohesive rim portion of the lower portion of the nail body; the non-cohesive rim portion includes a first non-cohesive rim portion at the first end of the nail body, a second non-cohesive rim portion at the second end of the nail body, and two side non-cohesive rim portions at both sides of the nail body; the first non-cohesive rim portion corresponds to 1/3 to 1/50 of the length between the first and the second ends of the nail body; the non-cohesive rim portion corresponds to 1/7 to 1/100 of the length between the first and the second ends of the nail body; and each of the side non-cohesive rim portions corresponds to 1/5 to 1/100 of the length between the both side ends of the nail body, and
wherein the release tape has a greater area than the double-sided adhesive tape body so that the release tape covers the entire surface of the double-sided adhesive tape body; a plurality of second cutting lines are provided at the release tape to pass through the release tape; and the release tape has a grip connecting to and protruding from the outer circumference at one end of the nail body.

2. The artificial nail according to claim 1, wherein the second cutting lines are formed at the same locations as the first cutting lines in a vertical direction, and the second cutting lines of the release tape curls into the first cutting lines of the double-sided tape.

3. The artificial nail according to claim 1, further comprising a coating layer provided at the upper portion of the design layer,
wherein an adhesive force of the coating layer and an ink applied to the design layer is 30% or less as a result of a coating adhesive force test by ASTM D3359.

4. The artificial nail according to claim 3, wherein the coating layer has glossiness of 50 or above as a result of a glossiness test by ASTM D523.

5. The artificial nail according to claim 3, wherein the coating layer has hardness of 1B or above as a result of a pencil hardness test by ASTM D3363.

6. The artificial nail according to claim 1, wherein the double-sided adhesive tape body has a peeling strength of 300 gf/10mm or above as a result of a 180° peeling strength test using SUS by ASTM D903.

7. The artificial nail according to claim 1, wherein the double-sided adhesive tape body has a peeling strength of 100 gf/10mm or above as a result of a 90° peeling strength test using ABS by ASTM D903.

8. The artificial nail according to claim 1, wherein each of the second cutting lines are extended to an outer circumference of the release tape.

9. The artificial nail according to claim 1, wherein the release tape has a tensile strength of 5 kg/cm$^2$ or above.

10. The artificial nail according to claim 1, wherein the release tape has a thickness of 30 μm to 300 μm.

11. The artificial nail according to claim 1, wherein the double-sided adhesive tape body has a thickness of 150 μm to 800 μm.

12. The artificial nail according to claim 1, wherein the release tape has a releasing force of 5 gf/50mm to 500 gf/50mm.

13. The artificial nail according to claim 1, wherein the release tape is made of any one of PE, EVA, PP, POE, and PET, or their copolymers or blends.

14. The artificial nail according to claim 1, wherein the double-sided adhesive tape body includes a substrate layer, and cohesive layers respectively coupled to upper and lower portions of the substrate layer.

15. The artificial nail according to claim 14,
wherein the cohesive layer includes a first cohesive layer located at the upper portion of the substrate layer and a second cohesive layer located at the lower portion of the substrate layer, and
wherein the first cohesive layer and the second cohesive layer have different cohesive forces.

16. The artificial nail according to claim 14, wherein the substrate layer is made of any one of PET, PE, PP, EVA, POE, and non-woven fabric.

* * * * *

UNITED STATES PATENT AND TRADEMARK OFFICE
CERTIFICATE OF CORRECTION

PATENT NO. : 8,528,570 B2  
APPLICATION NO. : 13/417871  
DATED : September 10, 2013  
INVENTOR(S) : Sung Yong Chang Page 1 of 1

It is certified that error appears in the above-identified patent and that said Letters Patent is hereby corrected as shown below:

IN THE CLAIMS:

In Column 13, Claim 1, Line 44:   please insert -- second -- before -- non-cohesive --.

Signed and Sealed this  
Sixteenth Day of June, 2015

Michelle K. Lee  
*Director of the United States Patent and Trademark Office*